(12) United States Patent
Lim et al.

(10) Patent No.: US 12,533,866 B2
(45) Date of Patent: Jan. 27, 2026

(54) INFRARED ADAPTIVE TRANSPARENT CAMOUFLAGE FILM

(71) Applicants: KOREA INSTITUTE OF MACHINERY & MATERIALS, Daejeon (KR); CENTER FOR ADVANCED META-MATERIALS, Daejeon (KR)

(72) Inventors: Mi Kyung Lim, Daejeon (KR); Hyeon Don Kim, Daejeon (KR); Kwang Seop Kim, Daejeon (KR); Jae Hyun Kim, Daejeon (KR); Hyun June Jung, Daejeon (KR); Hak Joo Lee, Daejeon (KR); Seung Min Hyun, Daejeon (KR)

(73) Assignees: KOREA INSTITUTE OF MACHINERY & MATERIALS;, Daejeon (KR); CENTER FOR ADVANCED META-MATERIALS, Daejeon (KR)

( * ) Notice: Subject to any disclaimer, the term of this patent is extended or adjusted under 35 U.S.C. 154(b) by 249 days.

(21) Appl. No.: 18/564,055

(22) PCT Filed: May 3, 2022

(86) PCT No.: PCT/KR2022/006324
§ 371 (c)(1),
(2) Date: Nov. 24, 2023

(87) PCT Pub. No.: WO2022/250315
PCT Pub. Date: Dec. 1, 2022

(65) Prior Publication Data
US 2024/0255823 A1    Aug. 1, 2024

(30) Foreign Application Priority Data
May 25, 2021   (KR) .................. 10-2021-0067141

(51) Int. Cl.
*B32B 3/14*   (2006.01)
*B32B 3/10*   (2006.01)
*B32B 3/18*   (2006.01)

(52) U.S. Cl.
CPC .................. *B32B 3/14* (2013.01); *B32B 3/10* (2013.01); *B32B 3/18* (2013.01)

(58) Field of Classification Search
CPC ................ B32B 3/14; B32B 3/10; B32B 3/18
(Continued)

(56) References Cited

U.S. PATENT DOCUMENTS

| 2017/0322094 | A1* | 11/2017 | Kim | .................. G01L 1/005 |
| 2018/0138231 | A1* | 5/2018 | Kim | .................. H10F 39/805 |
| 2024/0255823 | A1* | 8/2024 | Lim | .................. C01B 32/20 |

FOREIGN PATENT DOCUMENTS

| KR | 10-1419902 B1 | 7/2014 |
| KR | 10-1598025 B1 | 3/2016 |

(Continued)

OTHER PUBLICATIONS

International Search Report issued on Aug. 25, 2022, for corresponding International Patent Application No. PCT/KR2022/006324, along with an English translation (7 pages).

(Continued)

*Primary Examiner* — Betelhem Shewareged
(74) *Attorney, Agent, or Firm* — Hauptman Ham, LLP

(57) ABSTRACT

An infrared adaptive transparent camouflage film includes a substrate, a graphene layer, an electrode layer and an ion gel layer. The substrate has dielectric. The graphene layer is disposed on the substrate and stacked in multiple layer. The electrode layer is disposed over the substrate and is spaced apart from the graphene layer. The ion gel layer is disposed over the graphene layer and the electrode layer, or disposed (Continued)

between the graphene layer and the electrode layer, to dope the graphene layer electrically.

**20 Claims, 11 Drawing Sheets
(1 of 11 Drawing Sheet(s) Filed in Color)**

(58) Field of Classification Search
USPC .................................................. 428/195.1
See application file for complete search history.

(56) References Cited

FOREIGN PATENT DOCUMENTS

| | | |
|---|---|---|
| KR | 10-1723750 B1 | 4/2017 |
| KR | 10-2018-0054359 A | 5/2018 |
| KR | 10-2018-0101128 A | 9/2018 |
| WO | WO-2007084148 A2 * | 7/2007 ............. F41H 13/00 |

OTHER PUBLICATIONS

Written Opinion issued on Aug. 25, 2022, for corresponding International Patent Application No. PCT/KR2022/006324 (7 pages).
Kyung-Ah Park et al., "Thermal Radiative Properties of Multilayer Graphene/Glass Structure", Journal of the Korean Institute of Electrical and Electronic Material Engineers, Jan. 2021, vol. 34, No. 1, pp. 27-32, along with an English Abstract.
[Supportive material for Exception to Loss of Novelty]. Mi Gyeong Lim et al.,"Adaptive Metatextile for Thermal Camouflage", Proceedings of KSPE 2021 Spring Conference, May 12, 2021, p. 390.

* cited by examiner

INFRARED ADAPTIVE TRANSPARENT CAMOUFLAGE FILM

CROSS-REFERENCE TO RELATED APPLICATION

The present application is a national stage filing under 35 U.S.C § 371 of PCT application number PCT/KR2022/006324 filed on May 3, 2022, which is based upon and claims the benefit of priorities to Korean Patent Application No. 10-2021-0067141 filed on May 25, 2021, in the Korean Intellectual Property Office, which are incorporated herein in their entireties by reference.

BACKGROUND

1. Field of Disclosure

The present disclosure of invention relates to an infrared adaptive transparent camouflage film, and more specifically the present disclosure of invention relates to an infrared adaptive transparent camouflage film capable of controlling Fermi level of graphene to maintain transmissivity of a visible light above a certain level and to control emissivity efficiently.

2. Description of Related Technology

Recently, as the demand for various camouflage technologies or stealth-related technologies increases, technologies for devices with infrared stealth functions are being developed, as in Korean Patent No. 10-1723750.

The main technical feature of the infrared camouflage technology used to camouflage objects in the infrared image is that the surrounding background radiation and the thermal radiation of the object are combined.

These infrared camouflage-related technologies are divided into a method that controls the emissivity of the object surface and a method that controls the temperature of the object surface. The method that controls the emissivity of the object surface is being developed using multilayer graphene and is attracting attention as a promising technology because very little power is used to control the emissivity.

However, in the conventional method of controlling the emissivity using the multilayer graphene, more than 100 layers of the multilayer graphene had to be used to effectively control the emissivity. When using such a large number of the multilayer graphene, it is opaque in the visible light region, and thus there is a limitation in that independent camouflage in the visible and infrared regions is impossible.

Related prior art is Korean Patent No. 10-1723750.

SUMMARY

The present invention is developed to solve the above-mentioned problems of the related arts. The present invention provides an infrared adaptive transparent camouflage film capable of controlling Fermi level of graphene to maintain transmissivity of a visible light above a certain level and to control emissivity efficiently, so as to perform camouflage in the infrared region while maintaining transparency in the visible light region.

According to an example embodiment, an infrared adaptive transparent camouflage film includes a substrate, a graphene layer, an electrode layer and an ion gel layer. The substrate has dielectric. The graphene layer is disposed on the substrate and stacked in multiple layer. The electrode layer is disposed over the substrate and is spaced apart from the graphene layer. The ion gel layer is disposed over the graphene layer and the electrode layer, or disposed between the graphene layer and the electrode layer, to dope the graphene layer electrically.

In an example, the substrate may be transparent in a visual light region, and may be opaque in a longwave infrared region.

In an example, the substrate may be one of a glass, polydimethylsiloxane (PDMS), polyethyleneterephthalate (PET) and polyimide (PI).

In an example, the film may further include a power source configured to form an electric field between the electrode layer and the graphene layer. A first end of the power source may be connected to the electrode layer and a second end of the power source may be connected to the graphene layer.

In an example, infrared reflectivity of the graphene layer may be changed according to formation of the electric field. Absorptivity of infrared rays absorbed by the substrate may be changed according to the change of the infrared reflectivity of the graphene layer, and infrared emissivity of the infrared adaptive transparent camouflage film may be controlled.

In an example, in the graphene layer, 5 to 20 layers of graphene may be stacked.

In an example, the electrode layer may include a metal or graphene.

In an example, the graphene layer may be formed at a center of the substrate with a relatively larger area. The electrode layer may have an area smaller than the area of the graphene layer and do not overlap with the graphene layer.

In an example, the electrode layer may be configured to extend along an edge of the graphene layer.

In an example, the electrode layer may be configured to extend at least two edges of the graphene layer.

In an example, the graphene layer and the electrode layer may be formed on the substrate with the same layer. The ion gel layer may be formed over the graphene layer and the electrode layer.

In an example, the graphene layer may be formed on the substrate layer, the ion gel layer may be formed on the graphene layer, and the electrode layer may be formed on the ion gel layer.

In an example, the electrode layer may include an extending electrode configured to extend at a side of the substrate layer, and a plurality of branch electrodes configured to protrude toward a center of the substrate from the extending electrode along a vertical direction to the extending electrode. The branch electrodes may extend parallel with each other. The graphene layer may include an extending graphene configured to extend at an opposite side of the extending electrode, and a plurality of branch graphenes configured to protrude toward the center of the substrate from the extending graphene along a vertical direction to the extending graphene. The plurality of the branch graphenes may extend parallel with each other between the plurality of branch electrodes.

In an example, the film may further include a cover layer formed over the ion gel layer to cover the graphene layer, the electrode layer and the ion gel layer. The cover layer may be transparent in the infrared region and in the visible light region.

According to another example embodiment, an infrared adaptive transparent camouflage film includes a graphene layer, an electrode layer, and an ion gel layer. The graphene layer is stacked in multiple layer. The electrode layer is spaced apart from the graphene layer. The ion gel layer makes contact with the graphene layer and the electrode layer, and is configured to dope the graphene layer electrically. Absorptivity of infrared rays absorbed by the substrate is changed according to change of infrared reflectivity of the graphene layer, and infrared emissivity of the infrared adaptive transparent camouflage film is controlled.

In an example, the graphene layer and the electrode layer may be spaced apart from each other along a vertical direction. The ion gel layer may be disposed between the graphene layer and the electrode layer.

In an example, the film may further include a cover layer disposed over the graphene layer.

In an example, the graphene layer and the electrode layer may be spaced apart from each other along a horizontal direction. The ion gel layer may be disposed over or below the graphene layer and the electrode layer.

In an example, the film may further include a power source configured to form an electric field between the electrode layer and the graphene layer. A first end of the power source may be connected to the electrode layer and a second end of the power source may be connected to the graphene layer.

In an example, the electrode layer may include a metal or graphene. In the graphene layer, 5 to 20 layers of graphene may be stacked.

According to the present example embodiments, with an integrated structure of a substrate having a dielectric and a graphene layer stacked in multiple layers, an infrared adaptive transparent camouflage film that maintains transparency in the visible light region and controls opacity (absorptive or radioactive) in the infrared region, may be configured.

All infrared rays passing through the graphene layer are absorbed by the substrate having the dielectric, and all light absorbed by the substrate should be emitted to maintain thermal balance. Thus, by controlling the reflectivity or transmissivity of the graphene layer, the infrared emissivity of the transparent camouflage film may be controlled.

Here, in the case of the graphene layer, it is difficult to control the emissivity in the long-wave infrared region, but it is easy to control the reflectivity. Thus, the infrared emissivity of the transparent camouflage film may be effectively controlled by controlling the reflectivity of the graphene layer as described above.

In addition, in the case of the graphene layer, conventionally, emissivity control required stacking of about 100 layers, but effective control is possible with stacking of about 5 to 20 layers for reflectivity control. Thus, through a relatively small layered structure, effective emissivity control may be achieved while maintaining transmissivity in the visible light region.

Here, the infrared-adaptive transparent camouflage film described above may be implemented through a relatively simple structure in which the electrode part for forming an electric field is formed on one side and the ion gel layer is formed for electrical doping of the graphene layer. In addition, by various changing the stacked structure of the electrode part, the graphene layer, and the ion gel layer, design flexibility and manufacturing efficiency may be improved.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1A:
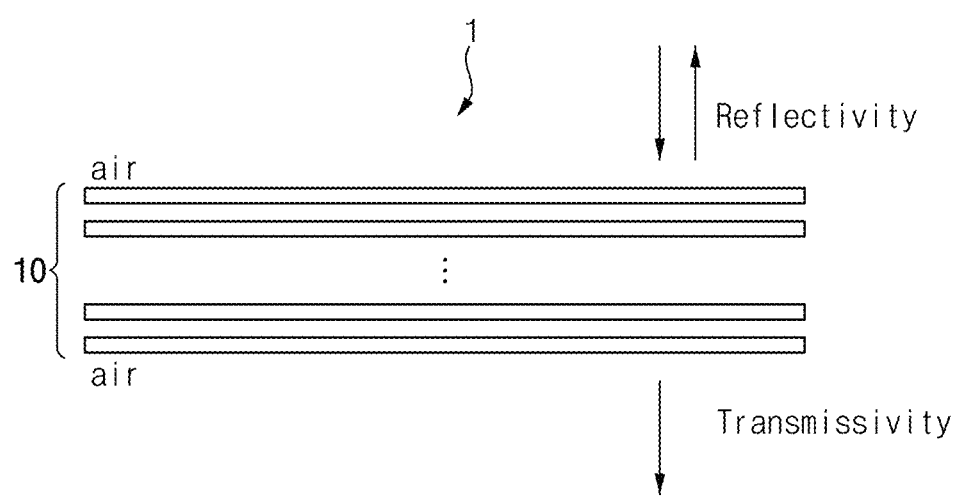
FIG. 1A is a schematic view for explaining reflectivity and transmissivity of a stack unit with multilayer graphene.

| * Reference numerals | |
|---|---|
| 1, 2: stack unit | 10: multilayer graphene |
| 20: dielectric | 450, 650: cover layer |
| 100, 101, 102, 200, 300, 400, 500, 600, 601: infrared adaptive transparent camouflage film | |
| 110, 210, 310, 410, 510: substrate | |
| 120, 121, 125, 220, 320, 420, 520, 620: electrode layer | |
| 130, 131, 230, 330, 430, 530, 630: graphene layer | |
| 140, 240, 340, 440, 540, 640: ion gel layer | |
| 160, 260, 360, 460, 560, 660: power source | |

DETAILED DESCRIPTION

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention is described more fully hereinafter with reference to the accompanying drawings, in which embodiments of the invention are shown.

Figure 1B:
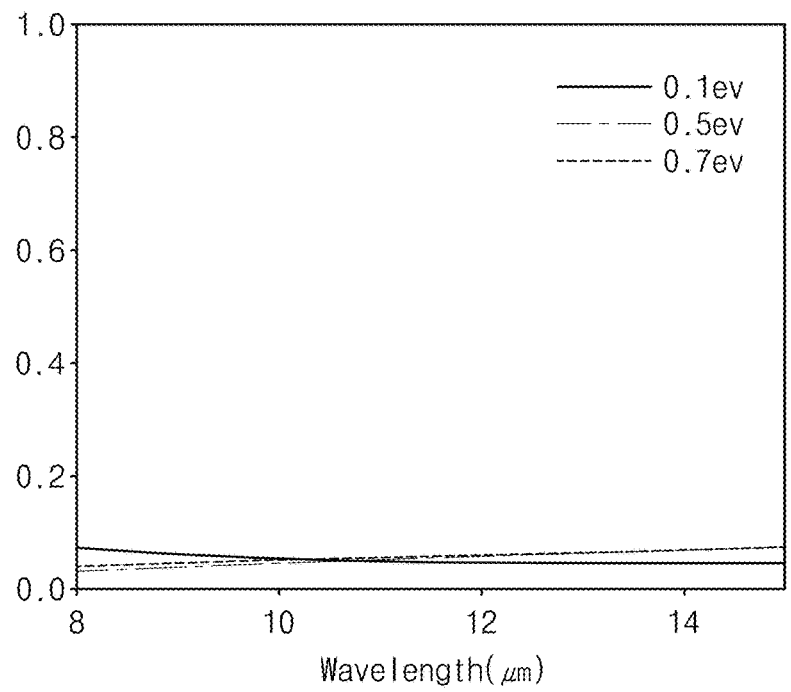
FIG. 1B is a graph showing a change of absorptivity (emissivity) according to Fermi level of the graphene of FIG. 1A.
Figure 1C:
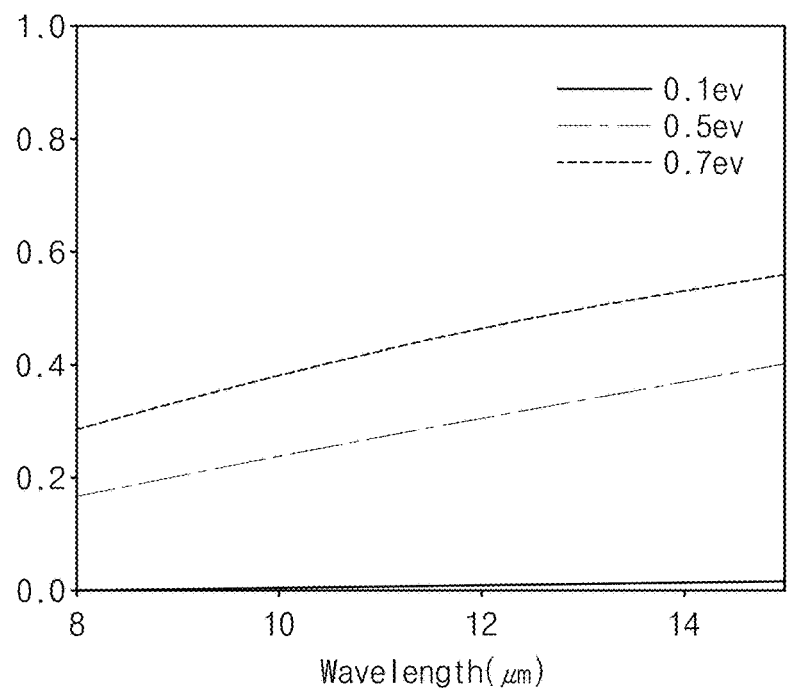
FIG. 1C is a graph showing a change of reflectivity according to Fermi level of the graphene of FIG. 1A.

FIG. 1A is a schematic view for explaining reflectivity and transmissivity of a stack unit with multilayer graphene, FIG. 1B is a graph showing a change of absorptivity (emissivity) according to Fermi level of the graphene of FIG. 1A, FIG. 1C is a graph showing a change of reflectivity according to Fermi level of the graphene of FIG. 1A.

Referring to FIG. 1A, when infrared rays are incident on the stack unit 1 in which a plurality of graphene layers are stacked, that is, multilayer graphene 10 is stacked, the infrared rays are partially reflected by the stack unit 1 and is partially transmitted. Here, as reflectivity of the stack unit 1 increases, transmissivity decreases, and as the reflectivity of the stack unit 1 decreases, the transmissivity increases.

As illustrated in FIG. 1B, for example, in the case of the stack unit 1 having the multilayer graphene 10 in which 10 layers are stacked, the emissivity hardly changes at a wavelength in a range between 8 μm and 15 μm, even though Fermi level of graphene varies between 0.1 eV and 0.7 eV.

This is because the absorption rate of the graphene itself is very low. That is, this is because the graphene has the low absorption rate in the infrared region regardless of changes in the Fermi level, and the emissivity remains constant with little change. Here, it is a well-known fact that, in the case of infrared light, in order to maintain thermal balance, all absorbed infrared light should be emitted, and the absorption rate is equal to the emissivity, in the infrared region.

Alternatively, as illustrated in FIG. 1C, in the stack unit 1 having the multilayer graphene 10 in which 10 layers are stacked, when the Fermi level of graphene varies in the range between 0.1 eV to 0.7 eV, there is a significant change of the reflectivity.

Accordingly, in the stack unit 1, the reflectivity changes significantly depending on the change in the Fermi level of graphene, which means that the transmissivity also changes significantly, considering that all incident light excluding the reflected light is the transmitted light (here, considering absorption and transmitted light and considering that there is almost no absorption, 1=absorptivity+transmissivity+reflectivity).

Figure 2A:
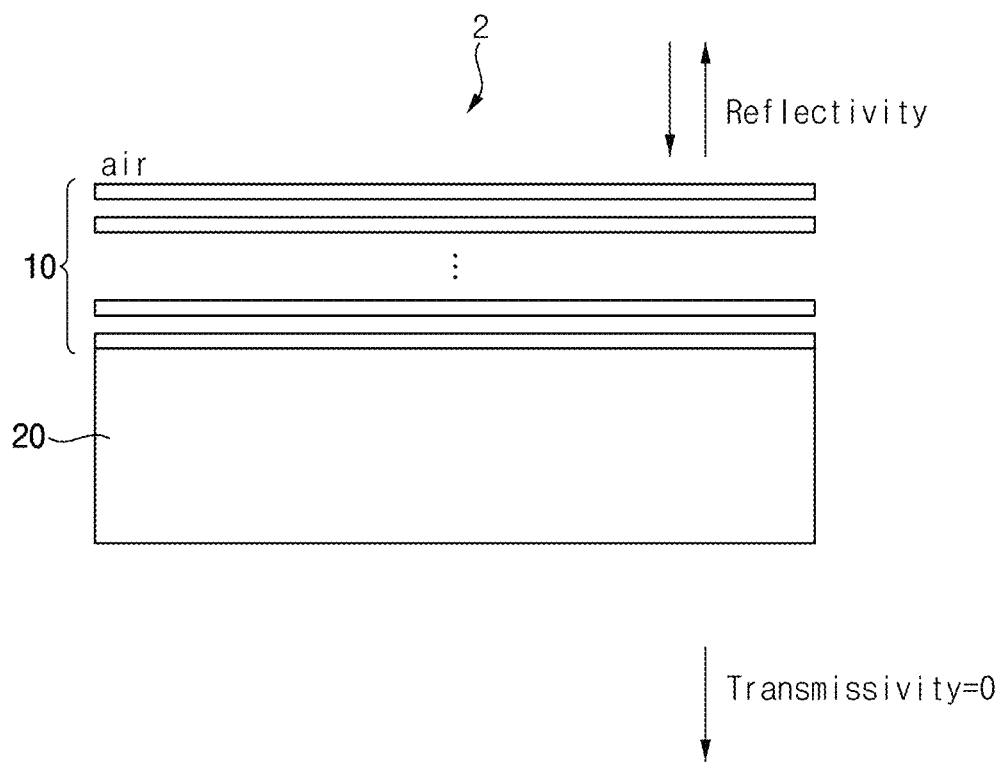
FIG. 2A is a schematic view for explaining reflectivity and transmissivity in a stack unit having multilayer graphene and dielectric as in the present example embodiment.
Figure 2B:
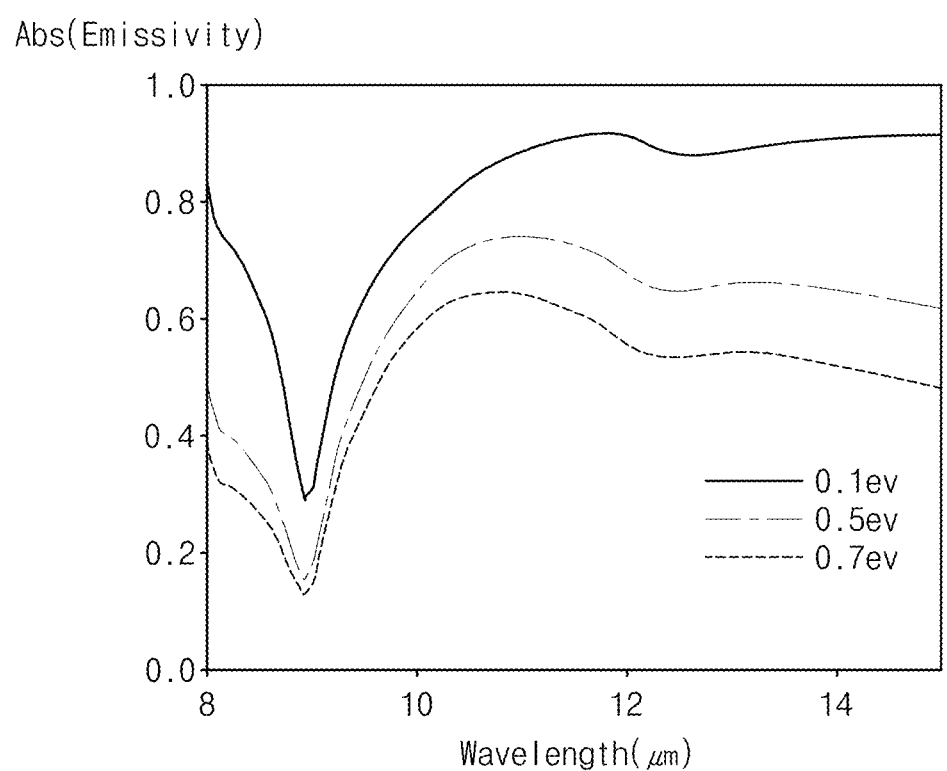
FIG. 2B is a graph showing a change of absorptivity according to Fermi level of the graphene of FIG. 2A.

FIG. 2A is a schematic view for explaining reflectivity and transmissivity in a stack unit having multilayer graphene and dielectric as in the present example embodiment, FIG. 2B is a graph showing a change of absorptivity according to Fermi level of the graphene of FIG. 2A.

As in the example embodiments explained below, referring to FIG. 2A, when infrared rays are incident on the stack unit 2, the infrared rays incident on the stack unit 2 are partially reflected by the multilayer graphene 10 and the remainder transmits through the multilayer graphene 10, as in the stack unit 1 of FIG. 1A described above. Here, the stack layer 2 includes the multilayer graphene 10 in which a plurality of graphene layers is stacked, and dielectric 20 disposed below the multilayer graphene 10.

However, as in the stack unit 2 of FIG. 2A, the dielectric 20 is disposed below the multilayer graphene 10, and the infrared rays passing through the multilayer graphene 10 is entirely absorbed by the dielectric 20 (transmissivity=0).

The infrared rays absorbed by the dielectric 20 are entirely emitted to maintain thermal balance as explained above. Thus, the infrared rays absorbed by the stack unit 2 should be entirely emitted, and the emissivity of the stack unit 2 is determined according to the absorptivity of the infrared rays absorbed by the dielectric 20.

As in the example embodiments explained below, when the dielectric 20 is disposed below the multilayer graphene 10 and the dielectric 20 entirely absorbs the infrared rays passing through the multilayer graphene 10 (since the absorbed light is entirely emitted), by controlling the transmissivity of the multilayer graphene 10 and the reflectivity of the multilayer graphene 10, the emissivity of the stack unit 20 may be controlled.

As in FIG. 2B, in the stack unit 2 having the 10-layered multilayer graphene 10 and the dielectric 20, when the Fermi level of the graphene is changed in the range between 0.1 eV and 0.7 eV, the emissivity is changed in the wavelength range between 8 μm and 15 μm.

Accordingly, using the stack unit in which the multilayer graphene and the dielectric are stacked, the emissivity of the stack unit may be changed according to the change of the Fermi level of the graphene.

The dielectric 20 may include a transparent material transparent in the visible light region, such as a glass, polydimethylsiloxane (PDMS), polyethyleneterephthalate (PET) and polyimide (PI), and the number of the layers of the graphene stacked in the multilayer graphene 10 may be minimized, and then the stack unit 2 may be maintained as a transparent state in the visible light region in a whole.

For example, as explained above, in the case that the graphene layer included by the multilayer graphene 10 is stacked with 10 layers, or between 5 layers and 20 layers, the transmissivity of the visible light may be maintained and the stack unit 2 may be maintained to be transparent in the visible light region.

Hereinafter, as example embodiments of the stack unit in which the multilayer graphene and the dielectric are stacked, an infrared adaptive transparent camouflage film is explained.

Figure 3A:
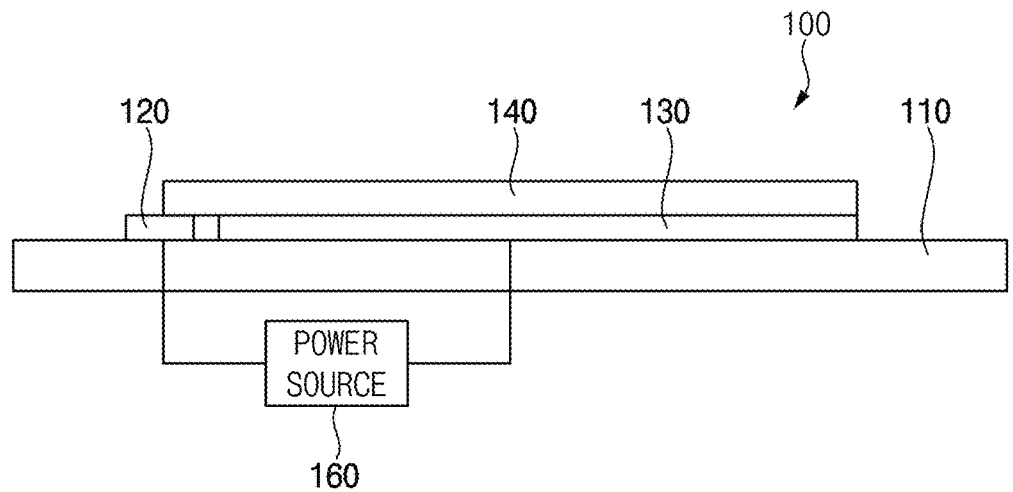
FIG. 3A is a cross-sectional view illustrating an infrared adaptive transparent camouflage film according to an example embodiment of the present invention.
Figure 3B:
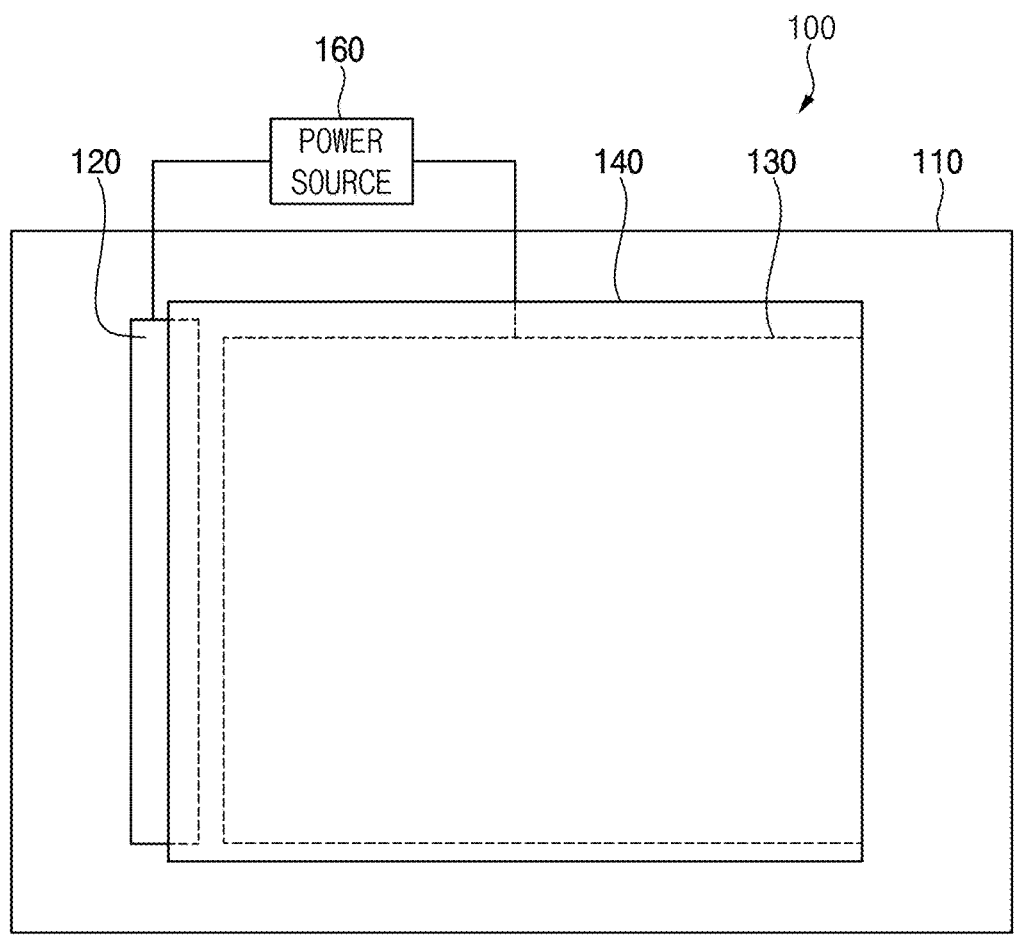
FIG. 3B is a plan view illustrating an example of the infrared adaptive transparent camouflage film of FIG. 3A.
Figure 3C:
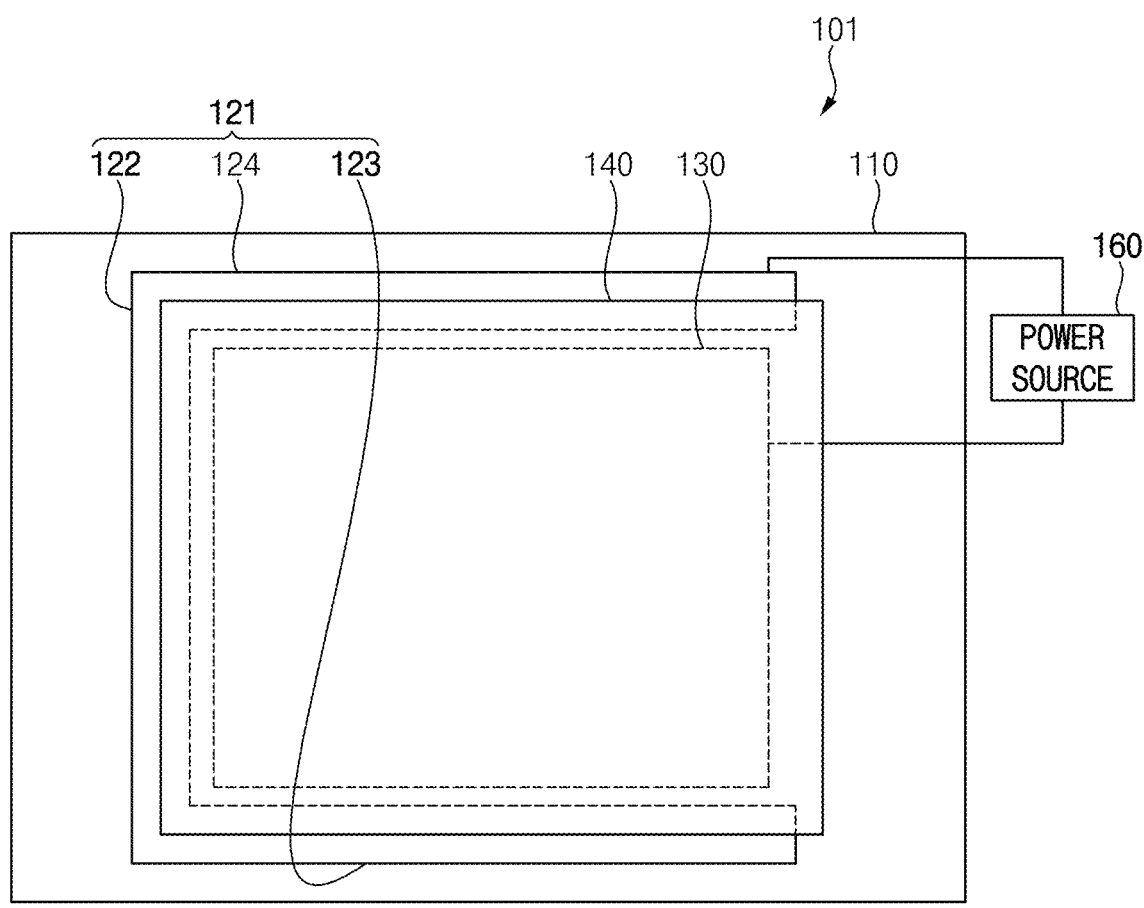
FIG. 3C is a plan view illustrating another example of the infrared adaptive transparent camouflage film of FIG. 3A.

FIG. 3A is a cross-sectional view illustrating an infrared adaptive transparent camouflage film according to an example embodiment of the present invention, FIG. 3B is a plan view illustrating an example of the infrared adaptive transparent camouflage film of FIG. 3A, and FIG. 3C is a plan view illustrating another example of the infrared adaptive transparent camouflage film of FIG. 3A.

Referring to FIG. 3A to FIG. 3C, the infrared adaptive transparent camouflage film according to the present example embodiment 100 (hereinafter, camouflage film), includes a substrate 110, an electrode layer 120 and 121, a graphene layer 130, an ion gel layer 140 and a power source 160.

The substrate 110 forms a base substrate, and includes the dielectric entirely absorbing the infrared rays incident from outside (upper side) like the dielectric 20 of FIG. 2A.

Alternatively, the substrate 110 may be opaque in a long wave infrared region, for example in the wavelength range between 8 μm and 15 μm, among the infrared region.

The substrate 110 may be one of a glass, polydimethylsiloxane (PDMS), polyethyleneterephthalate (PET) and polyimide (PI), and is transparent in the visible light region. The substrate 110 may be a hard substrate like the glass, or may be a flexible substrate like PDMS, PET, PI and so on.

When the substrate 110 is flexible, the camouflage film 100 may have flexibility in a whole, and thus the camouflage film 100 may be manufactured in a clothing-like form or in various forms to perform a camouflage role.

In addition, the substrate 110 is illustrated in the figure to have a rectangular shape, but the shape of the substrate 110 may be changed variously, and the thickness of the substrate 110 may be also sufficient as thick as it may absorb all of the infrared rays and the range of the thickness may not be limited.

The electrode layer 120 is formed on the substrate 110, and as illustrated in FIG. 3B, the electrode layer 120 may be formed at a side of the substrate 110 along the side of the substrate 110 in a whole.

When the graphene layer 130 has a rectangular shape, the electrode layer 120 may extend in a straight line along one of four sides of the graphene layer 130.

Alternatively, as illustrated in FIG. 3C, the electrode layer 121 is formed on the substrate 110, and the electrode layer 121 may extend along at least two sides of the graphene layer 130.

When the graphene layer 130 has the rectangular shape, the electrode layer 121 may include a first electrode 122 extending along a first side of the graphene 130, a second electrode 123 extending along a second side of the graphene 130, and a third electrode 124 extending along a third side of the graphene 130.

Thus, the electrode layer 121 may have the 'U' shape, with covering the three sides of the graphene 130 in a whole.

Further, although not shown in the figure, when the graphene layer 130 has the rectangular shape, a metal layer may be formed along the four sides of the graphene layer 130. Then, a first end of the power source 160 explained below may be connected to the electrode layer 120 and 121, and a second end of the power source 160 may be connected to the metal layer extending along the side of the graphene layer 130 without being connected to the graphene layer 130.

In the present example embodiment, the electrode layer 120 and 121, and the metal layer formed along the side of the graphene layer 130 may be a metal such as gold, silver, copper and so on.

Generally, the metal is opaque in the visible light region, and thus in the present example embodiment, the electrode 120 and 121 is formed along the side of the substrate 110 with a relatively smaller area, so that the transmissivity of the camouflage film 100 may be maintained in the visible light region.

The graphene layer 130 is formed on the substrate 110 and is spaced apart from the electrode layer 120 and 121 by a predetermined distance. The graphene layer 130 does not make contact with the electrode layer 120 and 121.

The graphene layer 130 is formed at a central portion of the substrate 110 with a relatively larger area, and the area of the graphene layer 130 may be changed variously. Here, the area of the graphene layer 130 is larger than that of the electrode layer 120 and 121.

A plurality of graphenes is stacked to form the graphene layer 130, and the number of the stacked graphene layers may be 5 layers to 20 layers.

When the number of the stacked graphene layers is over 20 layers, the visible light does not pass through the graphene layer 130 and the camouflage film 100 does not maintain transparency in the visible light region. In addition, when the number of the stacked graphene layers is less than 5 layers, it is difficult to effectively control the infrared reflectivity of the graphene layer 130 by forming an electric field between the graphene layer 130 and the electrode layer 120 and 121.

The ion gel layer 140 is formed on the electrode 120 and 121 and the graphene layer 130. As illustrated in the figure, an end side of the ion gel layer 140 extends with partially overlapping with the electrode 120 and 121, and most of the area including a central portion of the ion gel layer 140 overlaps with the graphene layer 130.

The ion gel layer 140 electrically dopes the graphene layer 130, and thus when the electric field is generated between the electrode layer 120 and 121 with the graphene layer 130, the infrared reflectivity of the graphene layer 130 may be efficiently controller.

The power source 160 is electrically connected between the electrode layer 120 and 121 and the graphene layer 130, and the power source 160 supplies a power to form the electric field between the electrode layer 120 and 121 and the graphene layer 130.

Here, when the metal layer is formed along the side of the graphene layer 130, as explained above, the power source 160 may be electrically connected to the metal layer.

Accordingly, as the electric field is generated between the electrode layer 120 and 121 and the graphene layer 130, the Fermi level of the graphene layer 130 is controlled, and thus the infrared ray incident on the graphene layer 130 are reflected. Here, the change of the reflectivity of the graphene layer 130 due to the change of the Fermi level is the same as explained in FIG. 1C.

As the power source 160 supplies the power, the electric field is generated between the electrode layer 120 and 121 and the graphene layer 130, and as the electric filed is variously controlled, the reflectivity of the infrared ray incident on the graphene layer 130 is variously controlled.

The control of the reflectivity of the infrared ray incident on the graphene layer 130 means the control of the transmissivity of the infrared ray passing through the graphene layer 130. In addition, the infrared ray passing through the graphene layer 130 is entirely absorbed by the substrate 110, and thus the control of the reflectivity of the infrared ray incident on the graphene layer 130 means the control of the absorptivity of the infrared ray by the substrate 110.

Further, since the infrared ray absorbed by the substrate 110 is finally emitted entirely, the control of the reflectivity of the infrared ray incident on the graphene layer 130 means the control of the emissivity of the infrared ray of the camouflage film 100.

Accordingly, the emissivity of the infrared ray of the camouflage film 100 may be controlled by controlling the power supply of the power source 160.

Figure 4:
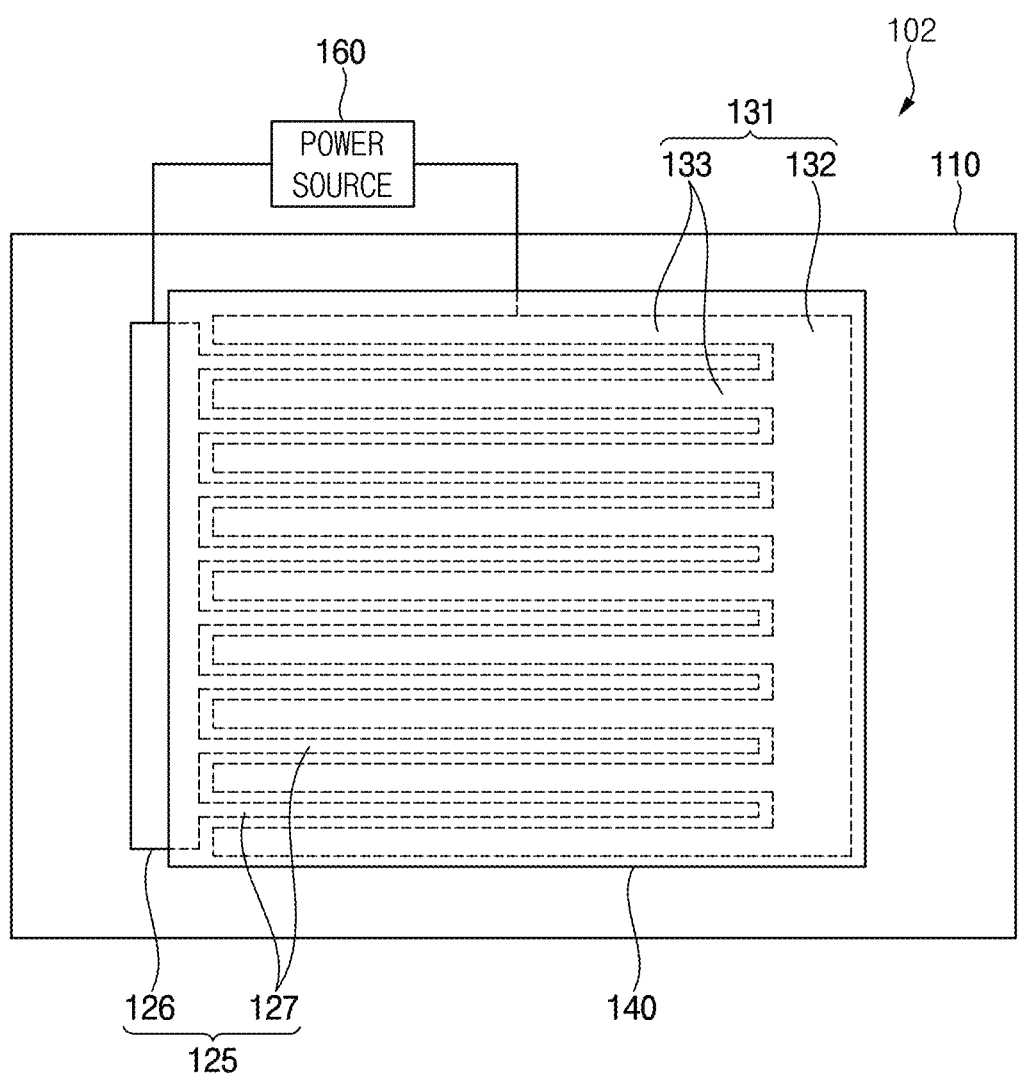
FIG. 4 is a plan view illustrating an infrared adaptive transparent camouflage film according to another example embodiment of the present invention.

FIG. 4 is a plan view illustrating an infrared adaptive transparent camouflage film according to another example embodiment of the present invention.

The camouflage film 102 according to the present example embodiment is substantially same as the camouflage film 100 of FIG. 3A and FIG. 3B, except for structures of an electrode layer 125 and a graphene layer 131, and thus the same reference numerals are used for the same reference numeral and any repetitive explanation will be omitted.

Referring to FIG. 4A, in the camouflage film 102 according to the present example embodiment, the electrode layer 125 includes an extending electrode 126 and a branch electrode 127, and the graphene layer 131 includes an extending graphene 132 and a branch graphene 133.

Here, the electrode layer 125 and the graphene layer 131 are formed on the substrate 100, and the ion gel layer 140 is formed on the electrode layer 125 and the graphene layer 131, as explained in FIG. 3A and FIG. 3B.

However, as illustrated in FIG. 4, the extending electrode 126 extends along a first side of the substrate 110, and a plurality of the branch electrodes 127 branches from the extending electrode 126.

The branch electrode 127 extends along a vertical direction to an extending direction of the extending electrode 126, and the plurality of the branch electrodes 127 is extended in parallel with maintaining a constant distance. Here, the branch electrode 127 passes through a central portion of the substrate 110, and may extend close to the extending graphene 132 formed at an opposite side of the extending electrode 126. An extending length of each of the branch electrodes 127 and the number of the branch electrodes 127 may be variously changed.

As explained above, the branch electrode 127 includes the metal and is opaque in the visible light region, and thus as the entire area of the branch electrodes 127 increases, the transmissivity of the camouflage film 102 decreases. Thus, the width of each branch electrode 127 may be formed relatively narrowly, and the width of each branch electrode 127 should be smaller than the width of each branch graphene 133. Then, the transmissivity of the camouflage film 102 may be maintained.

The extending graphene 132 is formed at a second side opposite to the first side at which the extending electrode 126 is formed, and the extending graphene 132 extends substantially same as the extending electrode 126.

The branch graphene 133 branches from the extending graphene 132, and the branch graphene 133 extends along a vertical direction to the extending direction of the extending graphene 132.

Here, a plurality of the branch graphenes 133 extends in parallel with maintaining a constant distance, by a predetermined length. In addition, each of the branch graphenes is disposed between the branch electrodes 127 adjacent to each other.

Thus, in a whole, the branch electrodes 127 and the branch graphenes 133 are alternately arranged on the substrate 110. Here, the branch electrode 127 and the branch graphene 133 adjacent to each other are spaced apart from each other without contacting with each other.

Accordingly, as the branch electrodes 127 and the branch graphenes 133 are alternately arranged, the area in which the branch electrode 127 and the branch graphene 133 face each other increases, and the electric field may be generated more effectively when the power is supplied by the power source 160.

In FIG. 4, each of the branch electrodes 127 and each of the branch graphenes 133 extend in a straight line along a direction, but the extending shape of the branch electrode 127 and the branch graphene 133 is not limited to the straight line and may be curved or be a zigzag shape. Further, the extending shape thereof may have various patterns.

Figure 5:
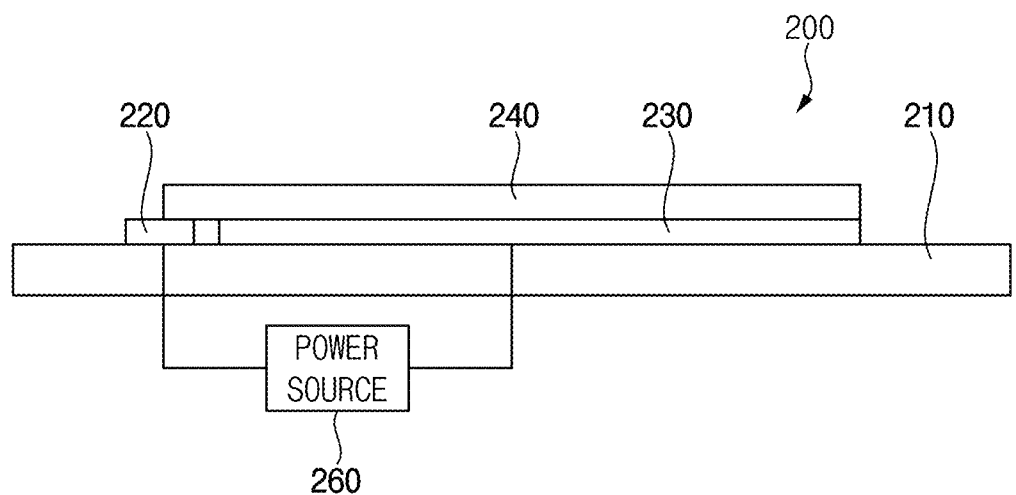
FIG. 5 is a cross-sectional view illustrating an infrared adaptive transparent camouflage film according to still another example embodiment of the present invention.

FIG. 5 is a cross-sectional view illustrating an infrared adaptive transparent camouflage film according to still another example embodiment of the present invention.

The camouflage film 200 according to the present example embodiment is substantially same as the camouflage film 100 of FIG. 3A and FIG. 3B, except for an electrode layer 220 having graphene, and thus the same reference numerals are used for the same reference numeral and any repetitive explanation will be omitted.

Referring to FIG. 5, in the camouflage film 200 according to the present example embodiment, the electrode layer 220 is formed on the substrate 210 with the graphene layer 230 and the electrode layer 220 is spaced apart from the graphene layer 230.

In addition, the ion gel layer 240 is formed on the electrode layer 220 and the graphene layer 230.

In the present example embodiment, the electrode 220 includes graphene, and a plurality of graphene layers may be stacked to form the electrode 220. Here, the number or the thickness of the stacked graphene layers may be variously changed.

The electrode layer 220 is formed with a relatively smaller area along a side of the substrate 210, and the electrode layer 220 is not necessary to be transparency. Thus, the number of the stacked graphene in the electrode layer 220 may be larger than that in the graphene layer 230. However, in a whole, the thickness of the electrode layer 220 should be substantially same as that of the graphene layer 230, and the number of the stacked graphene in the electrode layer 220 may be substantially same as that of the graphene layer 230.

Accordingly, the stacked graphene is formed as the electrode layer 220. Thus, the electric field is generated by the power supply as explained above, and the transmissivity may be maintained in the visible light region, so that the transmissivity of the camouflage film 200 may be enhanced.

Figure 6:
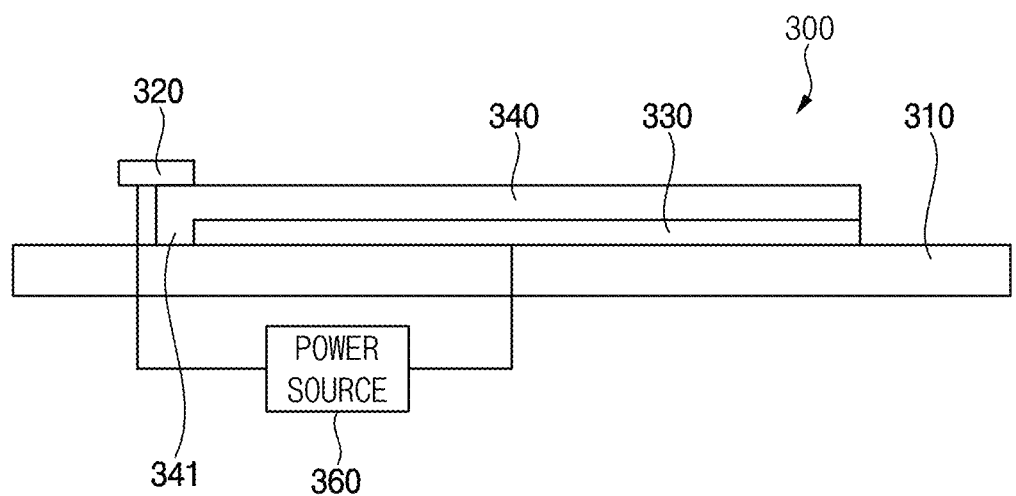
FIG. 6 is a cross-sectional view illustrating an infrared adaptive transparent camouflage film according to still another example embodiment of the present invention.

FIG. 6 is a cross-sectional view illustrating an infrared adaptive transparent camouflage film according to still another example embodiment of the present invention.

Referring to FIG. 6, the camouflage film 300 according to the present example embodiment includes a substrate 310, an electrode layer 320, a graphene layer 330, an ion gel layer 340 and a power source 360. The substrate 310 and the power source 360 are substantially same as the substrate 110 and the power source 160 in the camouflage film 100 of FIG. 3A.

In the present example embodiment, the graphene layer 330 is formed on the substrate 310 with a predetermined area, and here, the graphene layer 330 may be formed in most area including a central portion of the substrate 310.

The ion gel layer 340 is formed on the graphene layer 330, and a first side 341 of the ion gel layer 340 covers a side of the graphene layer 330 and makes contact with the substrate 310.

Accordingly, the first side 341 of the ion gel layer 340 entirely covers the side of the graphene layer 330 and makes contact with the substrate 310, and the electrode layer 320 is formed on the first side 341 of the ion gel layer 340, so that a separation state and an insulation state between the electrode layer 320 and the graphene layer 330 may be more enhanced.

In the present example embodiment, the electrode layer 320 is formed at the first side 341 of the ion gel layer 340, in which the graphene layer 330 is not formed under the electrode layer 320. Thus, the electrode layer 320 and the graphene layer 330 may be insulated from each other more effectively.

Thus, as the power is supplied by the power source 360, the electric field between the electrode layer 320 and the graphene layer 330 may be generated more effectively.

Figure 7:
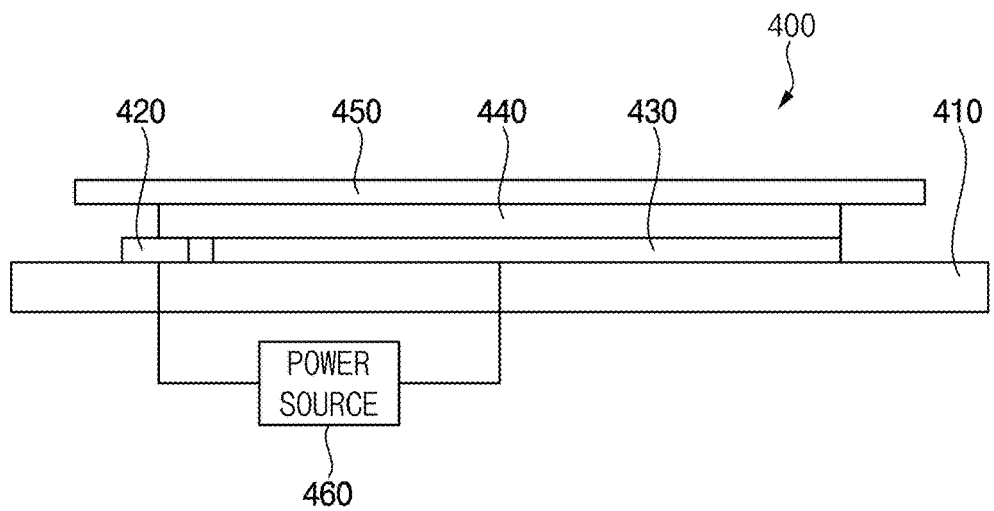
FIG. 7 is a cross-sectional view illustrating an infrared adaptive transparent camouflage film according to still another example embodiment of the present invention.

FIG. 7 is a cross-sectional view illustrating an infrared adaptive transparent camouflage film according to still another example embodiment of the present invention.

The camouflage film 400 according to the present example embodiment is substantially same as the camouflage film 100 of FIG. 3A and FIG. 3B, except for a cover layer 450, and thus the same reference numerals are used for the same reference numeral and any repetitive explanation will be omitted.

Referring to FIG. 7, the camouflage film 400 is substantially same as the camouflage film 100 in FIG. 3A and FIG. 3B, and thus, the electrode layer 420 and the graphene layer 430 are formed on the substrate 410 with being spaced apart from each other, and the ion gel layer 440 is formed on the electrode layer 420 and the graphene layer 430.

However, in the present example embodiment, the cover layer 450 is additionally formed on the ion gel layer 440, and thus the ion gel layer 440 in addition to the electrode layer 420 and the graphene layer 430 are covered by the cover layer 450.

The cover layer 450 may be transparent in the visible light region and in the infrared region, and may include polyethylene (PE).

Further, although not shown in the figure, the cover layer 450 may be additionally formed on the ion gel layer 140 of FIG. 4, on the ion gel layer 240 of FIG. 5, and the ion gel layer 340 and the electrode layer 320 of FIG. 6, and thus the layers and structures under the cover layer 450 may be stably protected.

Figure 8A:
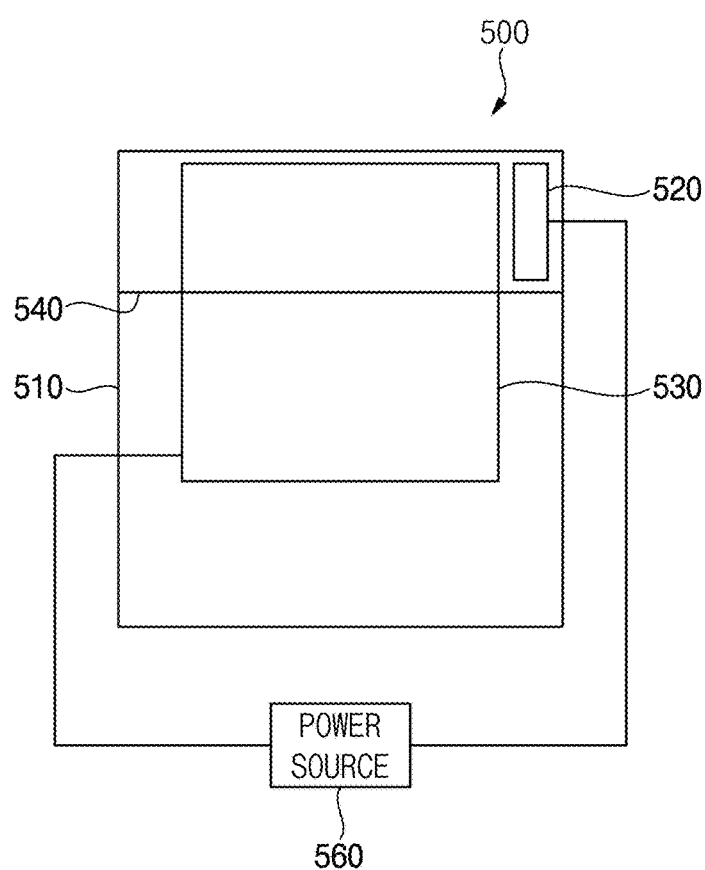
FIG. 8A is a plan view illustrating an infrared adaptive transparent camouflage film according to still another example embodiment of the present invention.
Figure 8B:
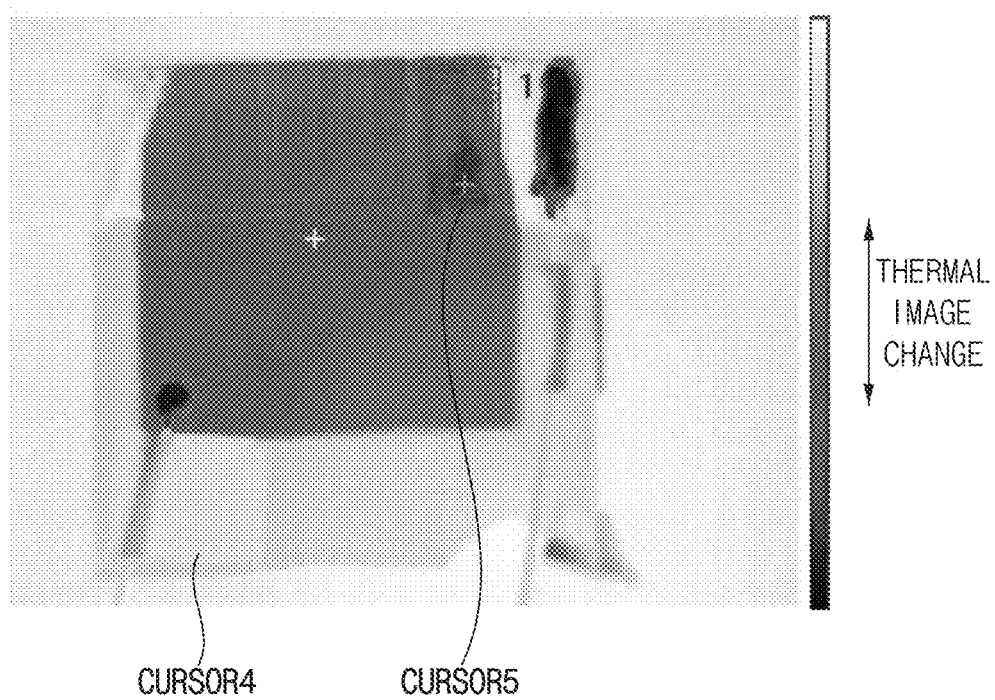
FIG. 8B is an image showing a change of a thermal image depending on voltage provided to the transparent camouflage film of FIG. 8A.
Figure 8C:
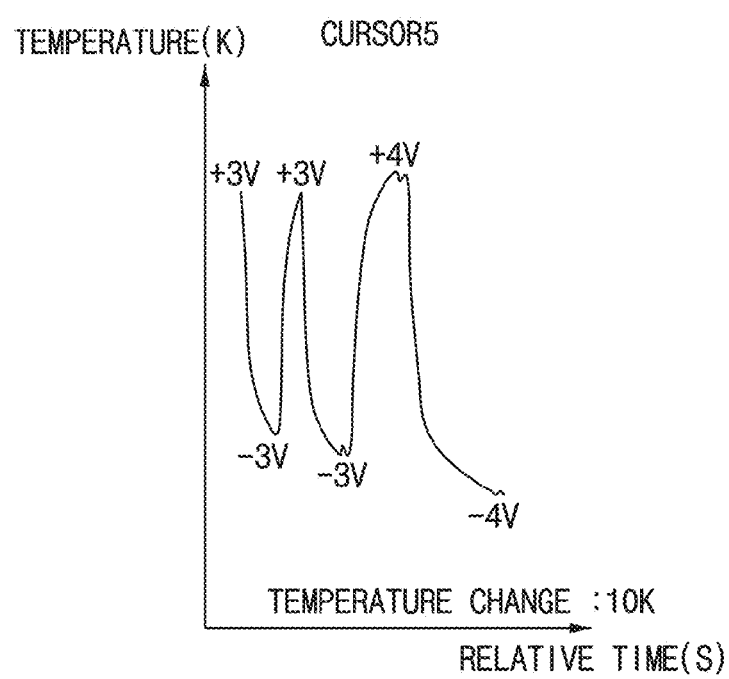
FIG. 8C is a graph showing a temperature change according to the change of the thermal image of FIG. 8B.

FIG. 8A is a plan view illustrating an infrared adaptive transparent camouflage film according to still another example embodiment of the present invention, FIG. 8B is an image showing a change of a thermal image depending on voltage provided to the transparent camouflage film of FIG. 8A, and FIG. 8C is a graph showing a temperature change according to the change of the thermal image of FIG. 8B.

The camouflage film 500 according to the present example embodiment is substantially same as the camouflage film 300 of FIG. 6, except for a position of an electrode layer 520 and an area of an ion gel layer 540, and thus the same reference numerals are used for the same reference numeral and any repetitive explanation will be omitted.

Referring to FIG. 8A, in the camouflage film 500 according to the present example embodiment, a graphene layer 530 is formed on a substrate 510 with a predetermined area, and the ion gel layer 540 is formed to cover a side and a partial area of the graphene layer 530.

Further, the electrode layer 520 is formed at a side edge of the ion gel layer 540, and the electrode layer 520 does not overlap with the graphene layer 530.

In addition, a first end of a power source 560 is connected to the graphene layer 530, and a second end of the power source 560 is connected to the electrode layer 520, to form the electric field.

In the camouflage film 500, as a result of checking a thermal image change according to the voltage provided, as illustrated in FIG. 8B, the thermal image of the camouflage film 500 is variously changed as the voltage supplied by the power source 560 is changed variously.

For example, referring to FIG. 8C, in an area of 'Cursor 5', when the voltage was provided by varying the voltage in the range between ±3V and ±4V, the infrared thermal image change, i.e. the apparent temperature change occurred approximately 10K (kelvin).

When the electric field was induced on the graphene layer 530, it was confirmed that the thermal image of the camouflage film 500 changed in the infrared region. The change in the thermal image in the infrared region means that the reflectivity of the camouflage film 500 in the infrared region changes. Further, this change in reflectivity ultimately means that the emissivity of the camouflage film 500 changes.

Thus, in the camouflage film 500 according to the present and previous example embodiments, the electric field is generated between the graphene layer and the electrode layer and the electric field is variously changed, so that the reflectivity of the camouflage film may be controlled in the infrared region, and this means that the emissivity of the camouflage film may be controlled in the infrared region.

Accordingly, using the camouflage film according to the present example embodiment, in the infrared wavelength region, especially in the long wave infrared region (approximately 8.0 μm to 15.0 μm wavelength range), the emissivity may be controlled in various ways, and in the case of the camouflage film, transparency may be sufficiently maintained in the visible light region.

Figure 9A:
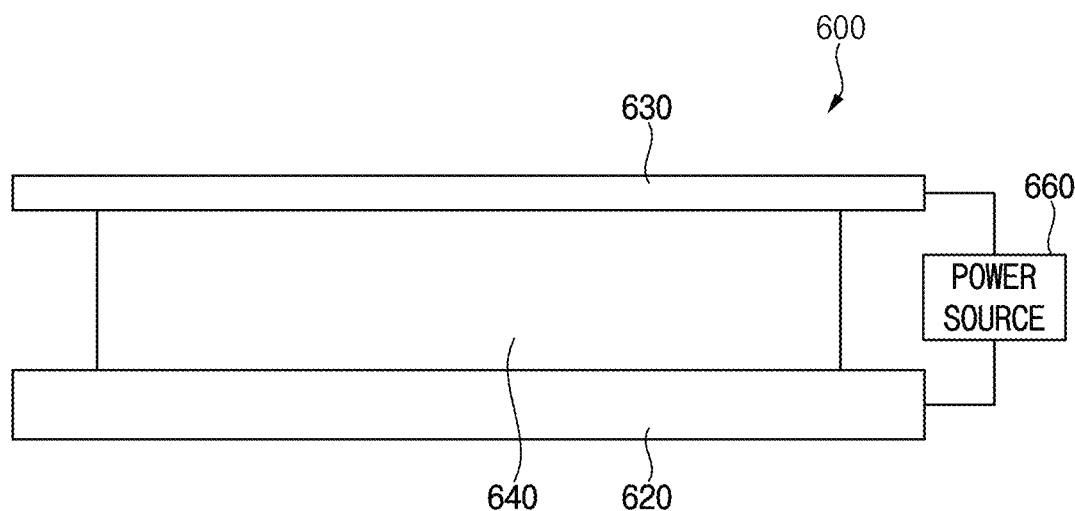
FIG. 9A and FIG. 9B are cross-sectional views illustrating an infrared adaptive transparent camouflage film according to still another example embodiment of the present invention.
Figure 9B:
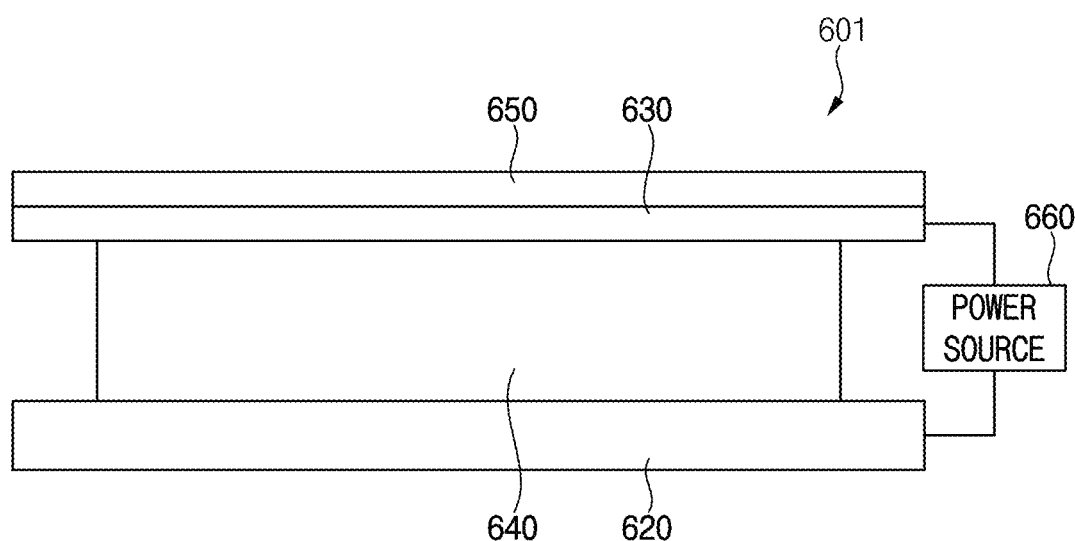

FIG. 9A and FIG. 9B are cross-sectional views illustrating an infrared adaptive transparent camouflage film according to still another example embodiment of the present invention.

Referring to FIG. 9A, the camouflage film 600 according to the present example embodiment includes an electrode layer 620, a graphene layer 630, an ion gel layer 640 and a power source 660.

In the present example embodiment, unlike the previous example embodiments, an additional substrate is omitted and the ion gel layer 640 functions as the substrate. Thus, the ion gel layer 640 has a relatively thick thickness, and the thickness of the ion gel layer 640 is thicker than that of the electrode layer 620 and that of the graphene layer 630.

Here, the ion gel layer 640 electrically dopes the graphene layer 630, to control the emissivity of the infrared rays of the graphene layer 130, as explained above.

The electrode layer 620 is formed beneath the ion gel layer 640, and may include a metal like the electrode layers explained above. However, in the present example embodiment, the electrode layer 620 is formed in an entire area of the camouflage film 600, and thus the electrode layer 620 may include a transparent electrode to maintain the transparency in the visible light region.

For example, the electrode layer 620 may include indium tin oxide (ITO) or indium zinc oxide (IZO).

Further, the electrode layer 620 may include one or two layers of graphene except for the transparent metal material above, and the electrode layer 620 may maintain the transparency in the visible light region even though the electrode layer 620 include one or two layers of graphene, as explained above.

The graphene layer 630 is formed on the ion gel layer 640, and the graphene layer 630 is spaced apart from the electrode layer 620 in an up and down (vertical) direction, by the thickness of the ion gel layer 640.

Here, the graphene layer 630 is formed by stacking a plurality of graphenes, and the stacked graphenes may be between 5 layers and 20 layers.

The power source 660 is connected between the electrode layer 620 and the graphene layer 630, and the electric field is generated between the electrode layer 620 and the graphene layer 630 by the power supply.

Thus, the Fermi level of the graphene layer 630 is controlled, and then the infrared ray incident on the graphene layer 630 is reflected. Further, by varying the electric field variously, the reflectivity of the infrared ray incident on the graphene layer 630 may be controlled, as explained above.

Accordingly, in the present example embodiment, the substrate is omitted and the ion gel layer 640 functions as the substrate, and the electrode layer 620 and the graphene layer 630 are spaced apart from each other along the up and down direction (vertical direction). Based on the above structure, as explained above, the infrared emissivity of the camouflage film 600 may be effectively controlled.

Referring to FIG. 9B, the camouflage film 601 according to the present example embodiment is substantially same as the camouflage film 600 of FIG. 9A, except for a cover layer 650 formed on the graphene layer 630.

As explained above referring to FIG. 7, the cover layer 650 protects the graphene layer 630, the ion gel layer 640 and the electrode layer 620, and the cover layer 650 may be formed in an entire area of the graphene layer 620.

In addition, the cover layer 450 may be polyethylene (PE) to maintain the transparency in the visible light region and the infrared region, as explained above.

According to the present example embodiments, with an integrated structure of a substrate having a dielectric and a graphene layer stacked in multiple layers, an infrared adaptive transparent camouflage film that maintains transparency in the visible light region and controls opacity (absorptive or radioactive) in the infrared region, may be configured.

All infrared rays passing through the graphene layer are absorbed by the substrate having the dielectric, and all light absorbed by the substrate should be emitted to maintain thermal balance. Thus, by controlling the reflectivity or transmissivity of the graphene layer, the infrared emissivity of the transparent camouflage film may be controlled.

Here, in the case of the graphene layer, it is difficult to control the emissivity in the long-wave infrared region, but it is easy to control the reflectivity. Thus, the infrared emissivity of the transparent camouflage film may be effectively controlled by controlling the reflectivity of the graphene layer as described above.

In addition, in the case of the graphene layer, conventionally, emissivity control required stacking of about 100 layers, but effective control is possible with stacking of about 5 to 20 layers for reflectivity control. Thus, through a relatively small layered structure, effective emissivity control may be achieved while maintaining transmissivity in the visible light region.

Here, the infrared adaptive transparent camouflage film described above may be implemented through a relatively simple structure in which the electrode part for forming an electric field is formed on one side and the ion gel layer is formed for electrical doping of the graphene layer. In addition, by variously changing the stacked structure of the electrode part, the graphene layer, and the ion gel layer, design flexibility and manufacturing efficiency may be improved.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An infrared adaptive transparent camouflage film comprising:
    a substrate having dielectric;
    a graphene layer disposed on the substrate and stacked in multiple layer;
    an electrode layer disposed over the substrate and spaced apart from the graphene layer; and
    an ion gel layer disposed over the graphene layer and the electrode layer, or disposed between the graphene layer and the electrode layer, to dope the graphene layer electrically.

2. The film of claim 1, wherein the substrate is transparent in a visual light region, and is opaque in a longwave infrared region.

3. The film of claim 2, wherein the substrate is one of a glass, polydimethylsiloxane (PDMS), polyethyleneterephthalate (PET) and polyimide (PI).

4. The film of claim 1, further comprising:
    a power source configured to form an electric field between the electrode layer and the graphene layer, wherein a first end of the power source is connected to the electrode layer and a second end of the power source is connected to the graphene layer.

5. The film of claim 4, wherein infrared reflectivity of the graphene layer is changed according to formation of the electric field,
    wherein absorptivity of infrared rays absorbed by the substrate is changed according to the change of the infrared reflectivity of the graphene layer, and infrared emissivity of the infrared adaptive transparent camouflage film is controlled.

6. The film of claim 5, wherein in the graphene layer, 5 to 20 layers of graphene are stacked.

7. The film of claim 1, wherein the electrode layer comprises a metal or graphene.

8. The film of claim 1, wherein the graphene layer is formed at a center of the substrate with a relatively larger area,
    wherein the electrode layer has an area smaller than the area of the graphene layer and does not overlap with the graphene layer.

9. The film of claim 8, wherein the electrode layer is configured to extend along an edge of the graphene layer.

10. The film of claim 8, wherein the electrode layer is configured to extend at least two edges of the graphene layer.

11. The film of claim 8, wherein the graphene layer and the electrode layer are formed on the substrate with the same layer,
    wherein the ion gel layer is formed over the graphene layer and the electrode layer.

12. The film of claim 8, wherein the graphene layer is formed on the substrate layer, the ion gel layer is formed on the graphene layer, and the electrode layer is formed on the ion gel layer.

13. The film of claim 8, wherein the electrode layer comprises an extending electrode configured to extend at a side of the substrate layer, and a plurality of branch electrodes configured to protrude toward a center of the substrate from the extending electrode along a vertical direction to the extending electrode, the branch electrodes extending parallel with each other, wherein the graphene layer comprises an extending graphene configured to extend at an opposite side of the extending electrode, and a plurality of branch graphenes configured to protrude toward the center of the substrate from the extending graphene along a vertical direction to the extending graphene, the plurality of the branch graphenes extending parallel with each other between the plurality of branch electrodes.

14. The film of claim 1, further comprising:
a cover layer formed over the ion gel layer to cover the graphene layer, the electrode layer and the ion gel layer,
wherein the cover layer is transparent in the infrared region and in the visible light region.

15. An infrared adaptive transparent camouflage film comprising:
a graphene layer stacked in multiple layer;
an electrode layer spaced apart from the graphene layer; and
an ion gel layer making contact with the graphene layer and the electrode layer, and configured to dope the graphene layer electrically,
wherein absorptivity of infrared rays absorbed by the substrate is changed according to change of infrared reflectivity of the graphene layer, and infrared emissivity of the infrared adaptive transparent camouflage film is controlled.

16. The film of claim 15, wherein the graphene layer and the electrode layer are spaced apart from each other along a vertical direction,
wherein the ion gel layer is disposed between the graphene layer and the electrode layer.

17. The film of claim 16, further comprising a cover layer disposed over the graphene layer.

18. The film of claim 15, wherein the graphene layer and the electrode layer are spaced apart from each other along a horizontal direction,
wherein the ion gel layer is disposed over or below the graphene layer and the electrode layer.

19. The film of claim 15, further comprising:
a power source configured to form an electric field between the electrode layer and the graphene layer,
wherein a first end of the power source is connected to the electrode layer and a second end of the power source is connected to the graphene layer.

20. The film of claim 15, wherein the electrode layer comprises a metal or graphene,
wherein in the graphene layer, 5 to 20 layers of graphene are stacked.

* * * * *